United States Patent

Mitate et al.

[11] Patent Number: 6,015,637
[45] Date of Patent: Jan. 18, 2000

[54] PROCESS OF PRODUCING LITHIUM NICKEL OXIDE AND NONAQUEOUS SECONDARY BATTERY USING THE SAME

[75] Inventors: Takehito Mitate, Yamatotakada; Naoto Torata, Kitakatsuragi-gun; Kazuaki Minato, Osaka; Toyoshi Iida, Fukui; Tetsushi Makino, Fukui; Shigeyuki Hamano, Fukui; Naoyoshi Kameda, Fukui, all of Japan

[73] Assignees: Sharp Kabushiki Kaisha, Osaka; Tanaka Chemical Corporation, Fukui, both of Japan

[21] Appl. No.: 08/941,196

[22] Filed: Sep. 30, 1997

[30] Foreign Application Priority Data

Sep. 30, 1996 [JP] Japan ................................. 8-258106

[51] Int. Cl.⁷ ....................................................... H01M 4/52
[52] U.S. Cl. ........................ 429/231.1; 429/223; 423/594
[58] Field of Search ................................ 429/223, 231.1; 423/592, 593, 594, 641

[56] References Cited

U.S. PATENT DOCUMENTS

| | | | |
|---|---|---|---|
| 4,567,031 | 1/1986 | Riley | 423/593 |
| 5,531,920 | 7/1996 | Mao et al. | 252/182.1 |
| 5,630,993 | 5/1997 | Amatucci et al. | 423/594 |
| 5,648,057 | 7/1997 | Ueda et al. | 423/594 |
| 5,677,086 | 10/1997 | Satoh et al. | 429/223 |

FOREIGN PATENT DOCUMENTS

| | | | |
|---|---|---|---|
| 2-40861 | 2/1990 | Japan . | |
| 6-44970 | 2/1994 | Japan . | |
| 6-44971 | 2/1994 | Japan . | |
| 6-96769 | 8/1994 | Japan . | |
| 7-230808 | 8/1995 | Japan | H01M 4/58 |
| 7-235306 | 9/1995 | Japan | H01M 4/58 |
| 8-31418 | 2/1996 | Japan . | |

OTHER PUBLICATIONS

Weast, editor "Handbook of Chemistry and Physics, 53rd Edition", p. B–113. (No month available), 1973.

Caurant et al. Synthesis by a soft chemistry route . . . Solid State Ionics, vol. 91, Issue 1–2, pp. 45–54, Oct. 1, 1996.

*Primary Examiner*—Maria Nuzzolillo
*Assistant Examiner*—Carol Chaney
*Attorney, Agent, or Firm*—Nixon and Vanderhye P.C.

[57] ABSTRACT

A process of preparing lithium nickel oxide as a positive electrode active material comprising: dissolving a water-soluble lithium compound and a water-soluble nickel compound in water to prepare a homogeneous aqueous solution; co-precipitating, from the aqueous solution, a lithium salt and a nickel salt which are slightly soluble in water; isolating the resulting co-precipitate and calcining the co-precipitate to obtain lithium nickel oxide.

16 Claims, 8 Drawing Sheets

PROCESS OF PRODUCING LITHIUM NICKEL OXIDE AND NONAQUEOUS SECONDARY BATTERY USING THE SAME

BACKGROUND OF THE INVENTION

1. Field of the Invention

The present invention relates to a process of producing lithium nickel oxide and also to a nonaqueous secondary battery using said lithium nickel oxide as an active material for positive electrode.

2. Related Art

In the Japanese Unexamined Patent Publication No. Hei 02(1990)-040,861, lithium nickel oxide is manufactured as follows. Solid lithium hydroxide and solid nickel oxide are mixed, the mixture is calcined in an atmospheric condition at 600° C. and the calcined product is pulverized and again calcined at 600° C. to 800° C. whereupon lithium nickel oxide is manufactured.

In the Japanese Unexamined Patent Publication No. Hei 05(1993)-251,079, solid lithium nitrate is mixed with at least one of solid nickel hydroxide and nickel oxyhydroxide and calcined at 500° C. to 1000° C. whereupon lithium nickel oxide is manufactured.

In the Japanese Unexamined Patent Publication No. Hei 06(1994)-044,970, a lithium nickel composite oxide is manufactured as follows. To a saturated aqueous solution containing at least one nickel salt selected from nickel halide, nickel sulfate, nickel phosphate, nickel acetate and nickel oxalate is added a saturated aqueous solution containing at least one lithium salt selected from lithium hydroxide, lithium carbonate and lithium hydrogencarbonate where said lithium salt is equimolar to the above nickel salt. The mixed solution is then evaporated to dryness with stirring and mixing in air or in vacuo and the resulting caky solid mixture is calcined at 600° C. to 800° C. whereupon a lithium nickel composite oxide is manufactured.

In the Japanese Unexamined Patent Publication No. Hei 06(1994)-044,971, a lithium nickel composite oxide is manufactured as follows. To at least one powdery nickel compound which is slightly soluble or insoluble in water selected from nickel oxide, nickel oxyhydroxide, nickel hydroxide and nickel carbonate is added a saturated aqueous solution of at least one lithium salt selected from lithium halide, lithium nitrate, lithium sulfate, lithium phosphate, lithium borate, lithium acetate and lithium oxalate followed by well kneading. This mixture is evaporated to dryness with stirring in air or in vacuo and the resulting caky solid mixture is calcined at 600° C. to 800° C. whereupon a lithium nickel composite oxide is manufactured.

In the Japanese Unexamined Patent Publication No. Hei 06(1994)-096,769, lithium nickel oxide is manufactured as follows. A lithium source and a nickel source are mixed so as to make the molar ratio of lithium in the lithium source to nickel in the nickel source 1:1. At that time, a small amount of water is added as a dispersing medium to the mixture. The resulting mixture is dried and calcined at 650° C. to 800° C. whereupon lithium nickel oxide is manufactured.

However, in the manufacturing processes of lithium nickel oxide mentioned in the Japanese Unexamined Patent Publications Nos. Hei 02(1990)-040,861 and Hei 05(1993)-251,079, a lithium compound and a nickel compound in a solid state are mixed and, therefore, it is difficult to mix them homogeneously.

In the manufacturing process of a lithium nickel composite oxide mentioned in the Japanese Unexamined Patent Publication No. Hei 06(1994)-044,970, lithium compound and nickel compound are mixed in a state of aqueous solution. However, in the steps of drying and solidifying the aqueous solution, deposition of the solutes does not take place simultaneously because solubilities of the solutes are different. Accordingly, in the resulting caky solid mixture, the lithium and nickel compounds are hardly mixed homogeneously.

In the manufacturing processes of lithium nickel oxide mentioned in the Japanese Unexamined Patent Publications Nos. Hei 06(1994)-044,971 and Hei 06(1994)-096,769, a mixing is conducted using water as a dispersing medium. However, in drying the mixture, the substances dissolved in the dispersing medium are not deposited uniformly. Therefore, the lithium compound and the nickel compound are not well mixed in the resulting mixture.

In a nonaqueous secondary battery where lithium nickel oxide obtained by calcining a mixture which is not sufficiently mixed is used as a positive electrode active material, a discharge capacity (hereinafter, just referred to as "capacity") significantly decreases upon repeated charging/discharging operations and the electrodes are quickly deteriorated.

SUMMARY OF THE INVENTION

An object of the present invention is to provide a process of manufacturing lithium nickel oxide by co-precipitating from a homogeneous aqueous solution of a lithium compound and a nickel compound and calcining the isolated co-precipitate and also to provide a nonaqueous secondary battery having improved charging/discharging cycle life by using the lithium nickel oxide as obtained.

Thus, the present invention provides a process of preparing lithium nickel oxide as a positive electrode active material comprising: dissolving a water-soluble lithium compound and a water-soluble nickel compound in water to prepare a homogeneous aqueous solution; co-precipitating, from the aqueous solution, a lithium salt and a nickel salt which are slightly soluble in water; isolating the resulting co-precipitate and calcining the co-precipitate to obtain lithium nickel oxide.

The present invention further provides a nonaqueous secondary battery comprising the lithium nickel oxide obtained according to the above-mentioned process as an active material for a positive electrode.

DESCRIPTION OF THE PREFERRED EMBODIMENTS

Figure 1:
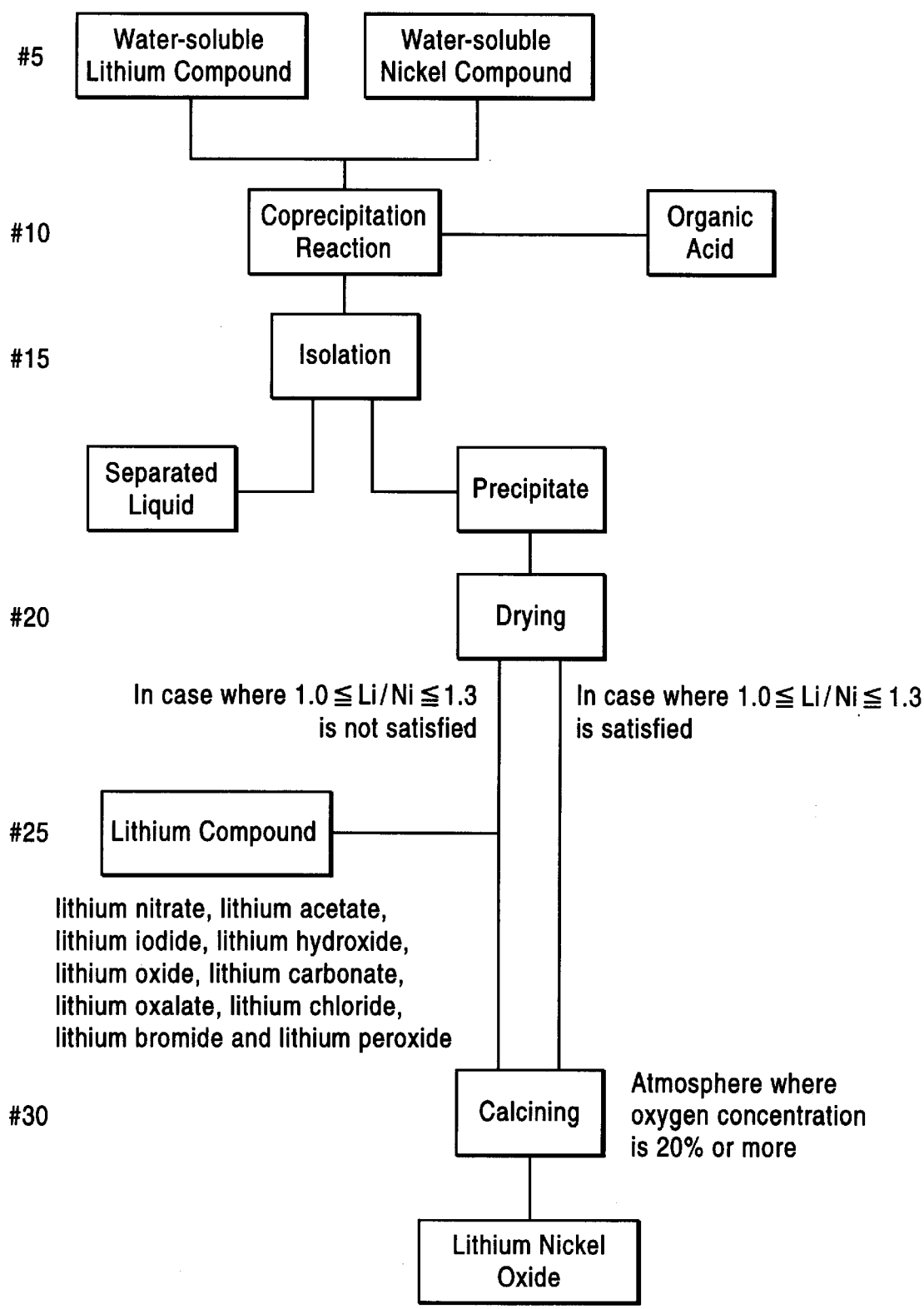
FIG. 1 shows a manufacturing process of lithium nickel oxide in accordance with the present invention.

A process of manufacturing lithium nickel oxide in accordance with the present invention will be mentioned in detail as hereunder. FIG. 1 is a flow chart showing a process for the manufacture of lithium nickel oxide according to the present invention. In a step #5, a water-soluble lithium compound and a water-soluble nickel compound are dissolved in water to prepare an aqueous solution. Examples of the water-soluble lithium compound to be used in the present invention include lithium nitrate, lithium hydrogensulfate, lithium hydrogenphosphate, lithium hydroxide, lithium oxide, lithium carbonate, lithium oxalate, lithium chloride, lithium bromide, lithium iodide, lithium acetate, lithium sulfide, lithium sulfate, lithium nitride and lithium peroxide. Particularly preferred water-soluble lithium compounds in terms of economy are lithium nitrate, lithium sulfate, lithium chloride, lithium bromide, lithium iodide and lithium acetate.

With regard to the water-soluble nickel compound, there is no particular limitation so far as it is soluble in water. For example, the use of nickel sulfate, nickel nitrate, nickel chloride, nickel bromide, nickel iodide or nickel acetate is preferred in terms of economy.

When the above-mentioned water-soluble nickel compound and the water-soluble lithium compound are dissolved and mixed in water, a homogeneous aqueous solution is prepared. Concentrations of the nickel and lithium compound used here may vary depending upon the particular compounds used. Further, the molar ratio of lithium to nickel (Li/Ni) in the water-soluble nickel and lithium compounds varies depending upon the type of an organic acid which is added later and, preferably, it is from 1 to 20. When the molar ratio of lithium to nickel (Li/Ni) is more than 20, there is a problem in terms of economy while, when aforesaid ratio is less than 1, it is not preferred because lithium and nickel compounds do not co-precipitate homogeneously upon addition of the organic acid. When economy, homogeneity and crystallinity after calcining are taken into consideration, said ratio is preferably from 1.5 to 10 and, if a capacity is further taken into consideration, it is preferably from 2 to 10.

In a step #10, coprecipitation from the homogeneous aqueous solution is conducted. Preferably, the coprecipitation may be conducted by adding an organic acid to the aqueous solution. The resulting precipitate comprises essentially salts of lithium and nickel with the organic acid. As a result of the coprecipitation, these salts are believed to be homogeneously mixed each others.

When the organic acid which is added thereto is soluble in water, said organic acid as an aqueous solution may be added to an aqueous solution in which the water-soluble lithium compound and the water-soluble nickel compound are dissolved. Incidentally, regardless of the fact whether the organic acid is soluble or insoluble in water, said acid may be added either in a state of solid or liquid. Addition of the organic acid as an aqueous solution or as a liquid is preferred because uniform fine particles of the salts are produced thereby while addition of the acid as a solid is also preferred because the coprecipitation can be more easily controlled.

The organic acids should be those which are soluble in water as they are or in the form of salt thereof (e.g., alkali metal salt) and are capable of forming salts of lithium and/or nickel which are slightly soluble or practically insoluble in water. Examples of the organic acids include aliphatic monocarboxylic acids having or not having hydroxyl group (e.g., propionic acid or lactic acid); aliphatic dicarboxylic acids having or not having hydroxyl group (e.g., oxalic acid, malonic acid, succinic acid; maleic acid or fumaric acid; malic acid, citramalic acid or tartaric acid) and aliphatic tricarboxylic acid having hydroxyl group (e.g., citric acid). Also, aliphatic monocarboxylic acids having oxo group such as pyruvic acid are also included in the organic acids. Such the organic acids would possess two to four carbon atoms. In terms of solubility and co-precipitating property, oxalic acid is preferred over other organic acids.

If oxalic acid is used as the organic acid, the following reaction may occur.

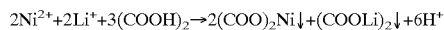

$$2Ni^{2+}+2Li^{+}+3(COOH)_2 \rightarrow 2(COO)_2Ni\downarrow+(COOLi)_2\downarrow+6H^{+}$$

As is apparent from the above formula, the present invention utilizes the difference between solubilities of a water-soluble lithium salt and a water-soluble nickel salt and that of slightly water-soluble salts.

In FIG. 1, although an organic acid is used for precipitating the salt which is slightly soluble in water, it is also possible to use salts of organic acids or carbonates having higher water solubility than the salts which are slightly soluble in water instead of the organic acid.

In a step #15, the resulting precipitate is isolated by means of filtration, centrifugation or the like. In a step #20, an isolated precipitate is dried. When a molar ratio of lithium to nickel in the dried precipitate (Li/Ni) is from 1 to 1.3, calcining is conducted in a step #30.

If, however, the ratio does not satisfy the above range, it is preferred that a lithium compound is supplemented to the precipitate in a step #25 to adjust the molar ratio of lithium to nickel (Li/Ni) to 1–1.3. When this molar ratio is adjusted to 1–1.3 as such, the battery wherein the resulting lithium nickel oxide is used as a positive electrode active material hardly results in a marked decrease in a discharge capacity even upon repeated charging/discharging operations. If the molar ratio or lithium to nickel (Li/Ni) is not adjusted to 1–1.3, it is not preferred because the problems such as poor crystallinity after calcining, small capacity, contamination with a lot of impurities etc. may take place.

There is no particular limitation for the lithium compound to be used in the step #25 although the preferred one is lithium nitrate, lithium acetate, lithium iodide, lithium hydroxide, lithium oxide, lithiumn carbonate, lithium oxalate, lithium chloride, lithium bromide or lithium peroxide. This is because the lithium compounds as mentioned above hardly remain as impurities after calcining and also have high safety.

In a step #30, the precipitate prepared hereinabove or a mixture of said precipitate with a lithium compound is calcined. It is preferred that the calcining is conducted at a temperature of 500° C. to 1000° C. in an atmosphere containing 20% to 100% by volume of oxygen for a time range from one hour to one week. It is more preferred in view of crystallinity and economy that the calcining is conducted at a temperature of 600° C. to 900° C. in an atmosphere containing 70% to 100% by volume of oxygen for a time range from one hour to three days. It is particularly preferred to conduct the calcining at a temperature of 650° C. to 900° C. in an atmosphere containing 80% to 100% by volume of oxygen because a positive electrode active material having suitable characteristics are obtained. Out of the above-mentioned ranges, there is a possibility that the problems such as poor crystallinity, small capacity and contamination with a lot of impurities may occur.

The lithium nickel oxide manufactured by the above-mentioned process can be represented by a formula $Li_xNiO_2$ where x is preferably within a range between 0.8 and 1.2 or, more preferably, within a range between 1.0 and 1.1.

As hereunder, an explanation will be given for a non-aqueous secondary battery in which the lithium nickel oxide prepared by the above-mentioned process is used as a positive electrode active material in a positive electrode although constitutions and manufacturing processes of a nonaqueous secondary battery are not limited thereto.

A positive electrode may be prepared using a mixture consisting of lithium nickel oxide, conductive materials, binders and, if necessary, solid electrolytes and the like.

Examples of the specific conductive materials to be used in the present invention include carbon material (such as carbon black, acetylene black and Ketchen black), powdery graphite materials (e.g., natural graphite and artificial graphite), powdery metal and fibrous metal, but are not limited thereto.

Examples of the specific binders to be used in the present invention include fluorine polymers (such as polytetrafluoroethylene and polyvinylidene fluoride), olefin polymers (such as polyethylene, polypropylene and ethylene-propylene-diene terpolymer) and styrene-butadiene rubber, but are not limited thereto.

The mixing ratio is preferably 1 part to 50 parts by weight of the conductive material and 1 part to 30 parts by weight of the binder with respect to 100 parts by weight of the positive electrode active material. If the proportion of the conductive material is less than 1 part by weight, the electrical resistance or polarization of the resulting positive electrode is increased to reduce the discharge capacity of the positive electrode, so that a practical secondary battery cannot be fabricated. If the proportion of the conductive material is greater than 50 parts by weight (which may vary depending on the kind of the conductive material to be blended), the amount of the active material contained in the positive electrode is reduced, so that the discharge capacity of the resulting positive electrode is reduced. If the proportion of the binder is less than 1 part by weight, the binding ability is lost. If the proportion of the binder is greater than 30 parts by weight, the discharge capacity of the resulting positive electrode is reduced to an impractical level, because the absolute amount of the active material contained in the resulting positive electrode is reduced as in the case of the conductive material and the electrical resistance or polarization of the positive electrode is increased as described above.

A positive electrode can be prepared by molding said mixture. Examples of the molding process include a process wherein the mixture is compressed into pellets and a process wherein a paste prepared by adding an appropriate solvent to the mixture is applied onto a collector, dried and compressed into a sheet form. The positive electrode preparation method is not limited to these methods. The positive electrode may be equipped with a collector playing a role of giving and receiving electrons. The collector is formed of a single metal, an alloy, a carbon material or the like. Examples of specific materials for the collector include titanium, aluminum, stainless steel, etc.; a material prepared by treating the surface of copper, aluminum, stainless steel, etc. with carbon, titanium or silver; and a material prepared by oxidizing the surface of the above-mentioned material. Particularly preferred examples are aluminum and stainless steel in terms of cost. Examples of the shape of the collector include foil, film, sheet, mesh sheet, punched one, lath, porous material, foamed material, molded products of fiber. The thickness of the collector is typically from 1 mm to 1 mm.

In a negative electrode, metal lithium, lithium alloys and/or lithium intercalation and deintercalation substances may be used as a negative electrode active material. Examples of the specific substances include metal lithium, lithium alloy(such as lithium/aluminum alloy, lithium/tin alloy, lithium/lead alloy, Wood's alloy, etc.), substances which can electrochemically be doped or dedoped with lithium ions(such as conductive polymers like polyacetylene, polythiophene, poly-p-phenylene, etc.), pyrolyzed carbon materials, carbon materials pyrolyzed in a gas-phase in the presence of a catalyst, carbon materials obtained by calcining pitch, cokes, tar, etc., carbon materials obtained by calcining polymers such as cellulose, phenol resin, etc., inorganic compounds (such as $WO_2$ and $MoO_2$), graphite materials (natural graphite, artificial graphite, expanded graphite and the like) which can be intercalated and deintercalated with lithium ions. These materials may be used either alone or as a composite thereof.

Among these negative electrode active materials, pyrolyzed carbon materials, carbon materials pyrolyzed in a gas phase in the presence of a catalyst, carbon materials obtained by calcining pitch, cokes, tar and the like, carbon materials obtained by calcining polymers and graphite materials (natural graphite, artificial graphite, expanded graphite and the like) are preferable for fabrication of a highly safe secondary battery having superior battery characteristcs.

Where the negative electrode is formed by employing any of the aforesaid conductive polymeric materials, carbon materials, graphite materials and inorganic compounds as the negative electrode active material, a conductive material and a binder may be blended therewith. Examples of specific conductive materials to be used include carbon materials such as carbon black, acetylene black and Ketchen black, powdery graphite materials (e.g., natural graphite and artificial graphite), powdery metals and fibrous metals, but are not limited thereto. Examples of specific binders include fluoropolymers such as polytetrafluoroethylene and polyvinylidene fluoride, olefin polymers such as polyethylene, polypropylene and ethylene-propylene-diene terpolymer, and styrene-butadiene rubber, but are not limited thereto.

Examplary ion conductors to be used for the nonaqueous secondary battery include an organic electrolytic solution, a solid electrolyte (e.g., a polymeric solid electrolyte or an inorganic solid electrolyte) and a molten salt, among which the organic electrolytic solution is preferred.

The organic electrolytic solution usually contains, an organic solvent and an electrolyte. Example of specific organic solvents to be used include aprotic organic solvents including esters such as propylene carbonate, ethylene carbonate, butylene carbonate, diethyl carbonate, dimethyl carbonate, methylethyl carbonate, g-butyrolactone, methyl formate and methyl acetate, tetrahydrofuran, substituted tetrahydrofuran such as 2-methyltetrahydrofuran, ethers such as dioxolane, diethyl ether, dimethoxyethane, diethoxyethane and methoxyethoxyethane, dimethylsulfoxide, sulfolane, methylsulfolane and acetonitrile. These organic solvents may be used either alone or in combination.

Examples of specific electrolytes include lithium salts such as lithium perchlorate, lithium borofluoride, lithium phosphorofluoride, lithium hexafluoroarsenate, lithium trifluoromethane sulfonate, lithium halides and lithium chloroaluminate. These electrolytes may be used either alone or in combination. The electrolytic solution is prepared by dissolving the electrolyte in the organic solvent. The organic solvent and the electrolyte to be used for the preparation of the electrolytic solution are not limited to these described above.

Examples of the applicable inorganic solid electrolyte include nitrides, halides, oxoacid salts of lithium. Examples thereof include $Li_3N$, $LiI$, $Li_3N$—$LiI$—$LiOH$, $LiSiO_4$, $LiSiO_4$—$LiI$—$LiOH$, $Li_3PO_4$—$Li_4SiO_4$, phosphorus sulfide compounds and $Li_2SiS_3$.

Usable as the organic solid electrolyte are a substance comprised of a polymer permitting the dissociation of the electrolyte and a substance comprised of a polymer having an ionization group. Examples of the polymer permitting the dissociation of the electrolyte include polyethylene oxide, derivatives of polyethylene oxide, polypropylene oxide, derivatives of polypropylene oxide, polymers containing at least such derivatives, phosphate polymers, etc.

Besides these, there is a process wherein a mixture of a polymer matrix material containing the above-mentioned aprotic polar solvent, a polymer containing an ionization group and the above-mentioned aprotic electrolyte and polyacrylonitrile are added to the electrolytic solution. Another process wherein an inorganic solid electrolyte and an organic solid electrolyte are jointly used is known as well.

A separator is used to retain the electrolytic solution. Examplary materials for the separator include woven fabric and nonwoven fabric of electrically insulative synthetic resin fibers, glass fibers, natural fibers, etc., microporous materials, molded products of alumina powder and the like. Among them, nonwoven fabric of polyethylene, polypropylene and like synthetic resins and microporous materials are particularly preferred in terms of quality stability.

A separator made of a nonwoven fabric of any of such synthetic resin fibers or a microporous material may be adapted to isolate the positive electrode and the negative electrode from each other when the battery is abnormally heated to cause the separator to be fused. From a viewpoint of safety, the separator of this type is preferably used. The thickness of the separator is not particularly limited as long as the separator can retain a required amount of the electrolyte solution and prevent the short circuit between the positive electrode and the negative electrode, but may be typically about 0.01 mm to about 1 mm, preferably about 0.02 mm to about 0.05 mm.

The battery may be in a shape of coin, button, sheet, cylinder, square, etc. In the case of batteries in a shape of coin or button, the positive electrode and the negative electrode are usually formed into pellets. In the case of batteries in a shape of cylinder and square, the positive electrode and the negative electrode are usually formed into sheets and put in a battery can. The electrodes are electrically connected to the can.

After that, the electrolyte solution is poured in the can, and the can is sealed with the sealing plate with an insulative packing interposed therebetween or with the sealing plate insulated from the can by a hermetic sealing. At that time, a safety valve including a safety device may be used for the sealing plate. Examplary safety devices include a fuse, a bimetal and PTC device which function as an overcurrent preventive device. For prevention of an increase in the inner pressure of the battery can, the hermetic sealing (gasket), the sealing plate or the battery can may be formed with a slit. Further, an external circuit for preventing over-charge or over-discharge of the battery may be used.

The pellet type or sheet type electrodes are preferably dried and dehydrated in advance in a usual manner. For example, hot air, vacuum, infrared radiation, far-infrared radiation, electron beam and low moisture air may be used alone or in combination for the drying and dehydration of the electrodes. The temperature for the drying and dehydration is preferably within a range between 50° C. and 380° C.

When lithium nickel oxide prepared by the manufacturing process of the present invention is used as a positive electrode active material, it is now possible to provide a nonaqueous secondary battery heaving a discharge capacity of not less than 24 mAh.

EXAMPLES

As hereunder, the result of the charging/discharging tests of a battery using lithium nickel oxide which was synthesized in accordance with the above-mentioned process of the present invention as a positive electrode active material will be given.

Examples 1–4 and Comparative Example 1.

Lithium nitrate and nickel sulfate were dissolved in water. Concentration of lithium nitrate was 1M. Here, aqueous solutions with various nickel sulfate concentrations were prepared for investigating the relationship between the molar ratio of lithium to nickel (Li/Ni) in the aqueous solution, and the discharge capacity of the battery where the lithium nickel oxide thus prepared was used as an active material.

Namely, concentrations of nickel sulfate were made 0.05M, 0.1M, 0.2M, 1M and 2M whereby the molar ratios of lithium to nickel in the solution (Li/Ni) were 20, 10, 5, 1 and 0.5, respectively. To each of these aqueous solutions was added oxalic acid in a solid state. The amount of oxalic acid added was 4 times as much as the smaller of the molar amounts of the nickel ion and the lithium ion in the aqueous solution.

The precipitate formed by the addition of oxalic acid was filtered and dried at 100° C. Chemical analysis was conducted at that time to determine the ratio of lithium to nickel (Li/Ni) in each of the precipitates whereupon the ratio was 1 or more only when the concentration of nickel sulfate was 0.05M and 0.1M and, therefore, lithium hydroxide was added to other precipitates so that the molar ratio was adjusted to 1.1. The precipitate was then calcined at 700° C. for two hours in an atmosphere containing 99% by volume of oxygen and the resulting calcined product was pulverized. Examples 1–4 and Comparative Example 1 corresponded to each of the concentrations of nickel sulfate.

A positive electrode was prepared using the lithium nickel oxide obtained above as an active material. Thus, lithium nickel oxide, acetylene black as a conductive material and polytetrafluoroethylene as a binder were mixed in a mortar in a weight ratio of 100:10:10. The mixture was molded with pressure and formed into pellets of 15 mm diameter, 0.75 mm thickness and 0.17 g weight.

A negative electrode was prepared as follows. Natural graphite from Madagascar (flakes; particles size: 11 mm; interplonar distance d(002) of plane (002) to the adjacent plane parallel to the plane (002): 0.337 nm; thickness (Lc)

of the crystal layer in the direction of plane (002): 27 nm; extent (La) of crystal layer in the direction of plane (002): 17 nm; intensity ratio (R) of the peak observed around 1360 $cm^{-1}$ to that observed around 1580 $cm^{-1}$ of wave numbers of scattering spectrum by an argon laser Raman analysis: 0; specific surface area: 8 $m^2/g$) was used as a negative electrode active material.

Natural graphite and polytetrafluoroethylene (a binder) were mixed in a weight ratio of 10:1. To this mixture was added a nickel mesh as a collector and molded with pressure to prepare pellets of 15 mm diameter, 0.59 mm thickness and 0.1 g weight. The pellets were dried in vacuo at 200° C. to remove moisture therefrom.

Figure 2:
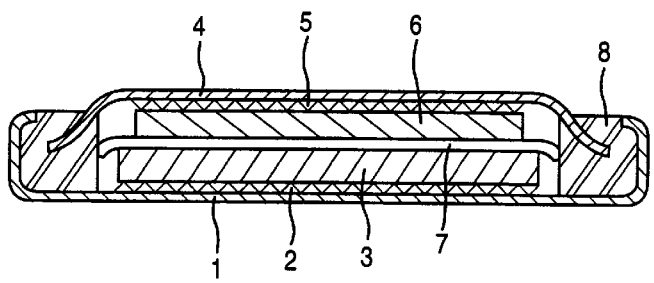
FIG. 2 shows a cross sectional view of a coin-type battery in accordance with the present invention.

A battery of a coin-type was constituted using the positive and negative electrodes which were prepared as follows. FIG. 2 shows a cross sectional view of the battery of a coin type in accordance with the present invention. In the inner part of a positive electrode can 1 having a low cylindrical shape, an insulating packing 8 was installed along the inside wall. A positive electrode 3 integrally formed with a positive electrode collector 2 was bonded with pressure to the central side from this insulating packing 8.

At that time, the positive electrode collector 2 was adjacent to the bottom of the positive electrode can 1. On this positive electrode 3, a separator 7 made of nonwoven polypropylene fabric and a negative electrode 6 which was integrally formed with a negative electrode collector 5 were placed adjacently in this order from bottom to top. The separator 7 was impregnated with an electrolyte solution where lithium phosphofluoride was dissolved in a concentration of 1M in a solvent which was a 1:1 (by volume) mixture of ethylene carbonate and diethyl carbonate.

A negative electrode can 4 was placed over the negative electrode 6 and this negative electrode can 4 and the positive electrode can 1 were tightly sealed by means of caulking via an insulation packing 8. As a result, the negative electrode 6 was bonded with pressure tightly to the negative electrode can 4 and, especially, the negative electrode collector 5 was contact with the inner surface of the negative electrode can 4.

The charging/discharging test of this battery of a coin-type was conducted as follows. A charging/discharging current was 2 mA and a constant-current charging was conducted until the upper-limit charging voltage of 4.2 V and then constant-voltage charging was conducted at 4.2 V. Total time for the constant-current charging and the constant-voltage charging was 24 hours. Constant-current discharging was conducted until 2.5 V of the lower-limit discharging voltage. In the second run and thereafter, charging/discharging was conducted within a range of the same current and voltage and the discharge capacity at the third charging/discharging cycle was measured.

Figure 3:
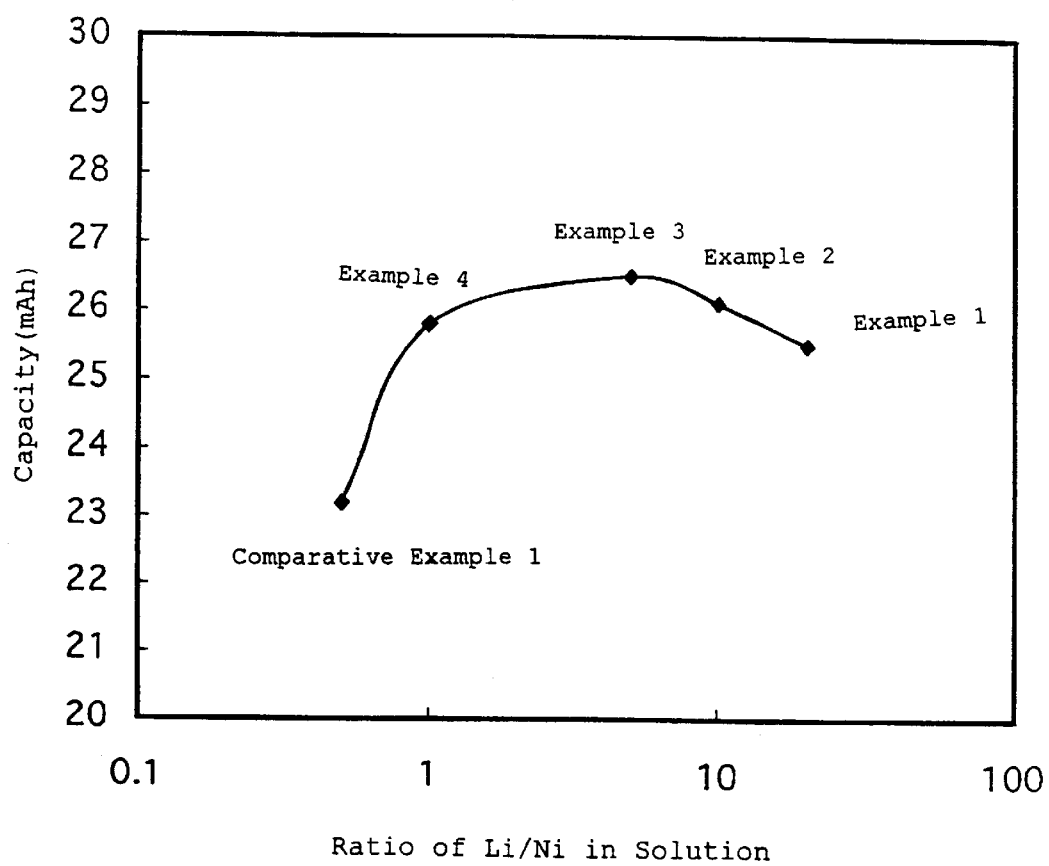
FIG. 3 shows a relationship between the molar ratio of lithium to nickel in an aqueous solution of a lithium compound and a nickel compound and the discharge capacity of a battery using the lithium nickel oxide as an active material for a positive electrode.

FIG. 3 shows the relationship between the molar ratio of nickel ion to lithium ion in an aqueous solution and the discharge capacity. When the molar ratio was 1 or more, a higher discharge capacity was achieved as compared with the case where said ratio was less than 1. Therefore, it was noted that a battery having a high initial discharge capacity was prepared when the molar ratio of nickel ion to lithium ion in the aqueous solution was 1 or more.

Examples 5–11 and Comparative Examples 2–3.

Lithium chloride and nickel nitrate were dissolved in water to make their amounts 1M and 0.05M, respectively. Solid oxalic acid was added to this aqueous solution in an amount of 0.3M. This corresponded to the fact that the amount of oxalic acid added was six times as much as the smaller of the molar amounts of the lithium ion and the nickel ion dissolved in the aqueous solution. An aqueous solution where a precipitate was produced by addition of oxalic acid was filtered and the resulting precipitate was dried at 100° C. Then, calcining was conducted at various temperatures for investigating the relationship between the calcining temperature and the discharge capacity of the battery where the resulting lithium nickel oxide was used as an active material.

Thus, the precipitate was calcined at each of the temperatures of 450° C., 500° C., 600° C., 650° C., 700° C., 800° C., 900° C., 1000° C. and 1100° C. The calcining time was ten hours at a temperature of 450° C. to 900° C. and two hours at a temperature of 1000° C. or 1100° C. The ratio of oxygen by volume in the calcining atmosphere was 95% in all cases. The above-mentioned calcining temperatures in this order corresponded to Comparative Example 2, Examples 5–11 and Comparative Example 3, respectively.

A positive electrode was prepared using the lithium nickel oxide manufactured hereinabove as an active material. The same operations as in the preparation of the positive electrode for a coin-type battery as mentioned already were applied including the process of manufacture of the electrode and weight and size of the pellets except that lithium nickel oxide, acetylene black as a conductor and polytetrafluoroethylene as a binder were mixed in a weight ratio of 100:8:5. Preparation of a negative electrode was also conducted in the same manner as in that of the negative electrode for the above-mentioned coin-type battery.

Constitution of the coin-type battery using these electrodes was the same as that of the above-mentioned coin-type battery except that a solution where 1M of lithium perchlorate was dissolved in a solvent prepared by mixing ethylene carbonate and dimethyl carbonate in a ratio of 1:1 by volume was used as an electrolyte solution. Charging/discharging test of the resulting coin-type battery was also conducted in the same manner as that in the above-mentioned coin-type battery.

Figure 4:
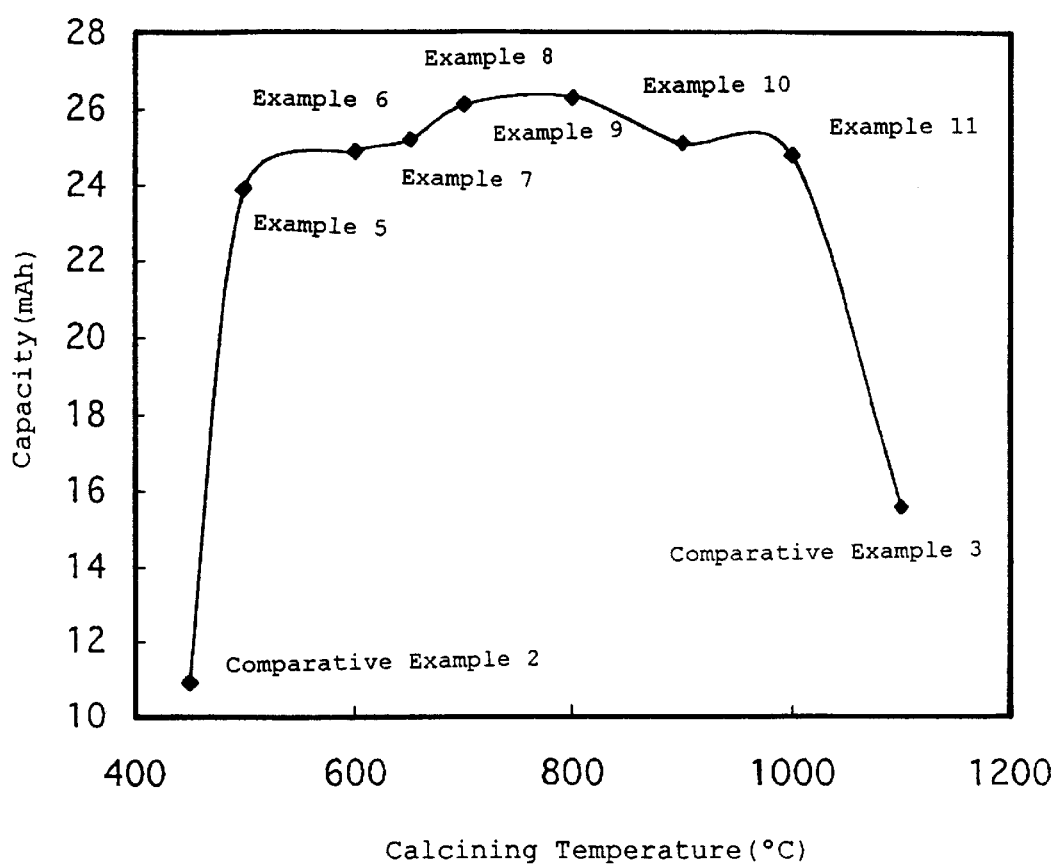
FIG. 4 shows a relationship between a calcining temperature and a discharge capacity of a battery where the lithium nickel oxide is used as an active material for a positive electrode.

FIG. 4 shows a relationship between the calcining temperature and the discharge capacity. A discharge capacity of a high value was achieved when the calcining temperature was 500° C. to 1000° C., preferably 600° C. to 900° C. or, particularly preferably, 650° C. to 900° C. Accordingly, it was noted that, when a calcining temperature was 500° C. to 1000° C., electrodes having a high initial discharge capacity were prepared.

Examples 12–21.

Lithium chloride and nickel sulfate were dissolved in water to make their amounts 1M and 0.1M, respectively. The molar ratio of lithium to nickel (Li/Ni) in this solution was 10. Oxalic acid dissolved in water was added to this solution to make the amount of the oxalic acid 0.3M. This corresponds to the fact that the amount of oxalic acid added was three times as much as the smaller of the molar amounts of the lithium ion and the nickel ion dissolved in the aqueous solution. The aqueous solution wherein a precipitate was formed by addition of oxalic acid was filtered and the resulting precipitate was dried at 100° C.

Calcining was conducted in atmospheres containing various oxygen concentrations in order to investigate the relationship between the amount of oxygen in the calcining atmosphere and the discharge capacity of the battery where the resulting lithium nickel oxide was used as an active material. Thus, the precipitate was calcined in each of the atmospheres where the oxygen amounts by volume were 20%, 30%, 50%, 70%, 75%, 80%, 90%, 95%, 99% and 100%. In all of the cases, calcining was conducted at 800° C. for three hours. The above-mentioned oxygen amounts by volume in this order corresponded to Examples 12–21, respectively.

A positive electrode was prepared using the lithium nickel oxide manufactured hereinabove as an active material. The same operations as in the preparation of the positive electrode for a coin-type battery as mentioned already were applied including the process of manufacture of the electrode and weight and size of the pellets except that lithium nickel oxide, acetylene black as a conductor and polytetrafluoroethylene as a binder were mixed in a weight ratio of 100:5:4. Preparation of a negative electrode was also conducted in the same manner as in that of the negative electrode for the above-mentioned coin-type battery.

Constitution of the coin-type battery using these electrodes was the same as that of the above-mentioned coin-type battery except that a solution where 1M of lithium phosphofluoride was dissolved in a solvent prepared by mixing ethylene carbonate and ethyl methyl carbonate in a ratio of 1:1 by volume was used as an electrolyte solution. Charging/discharging test of the resulting coin-type battery was conducted in the same manner as that in the above-mentioned coin-type battery as well.

Figure 5:
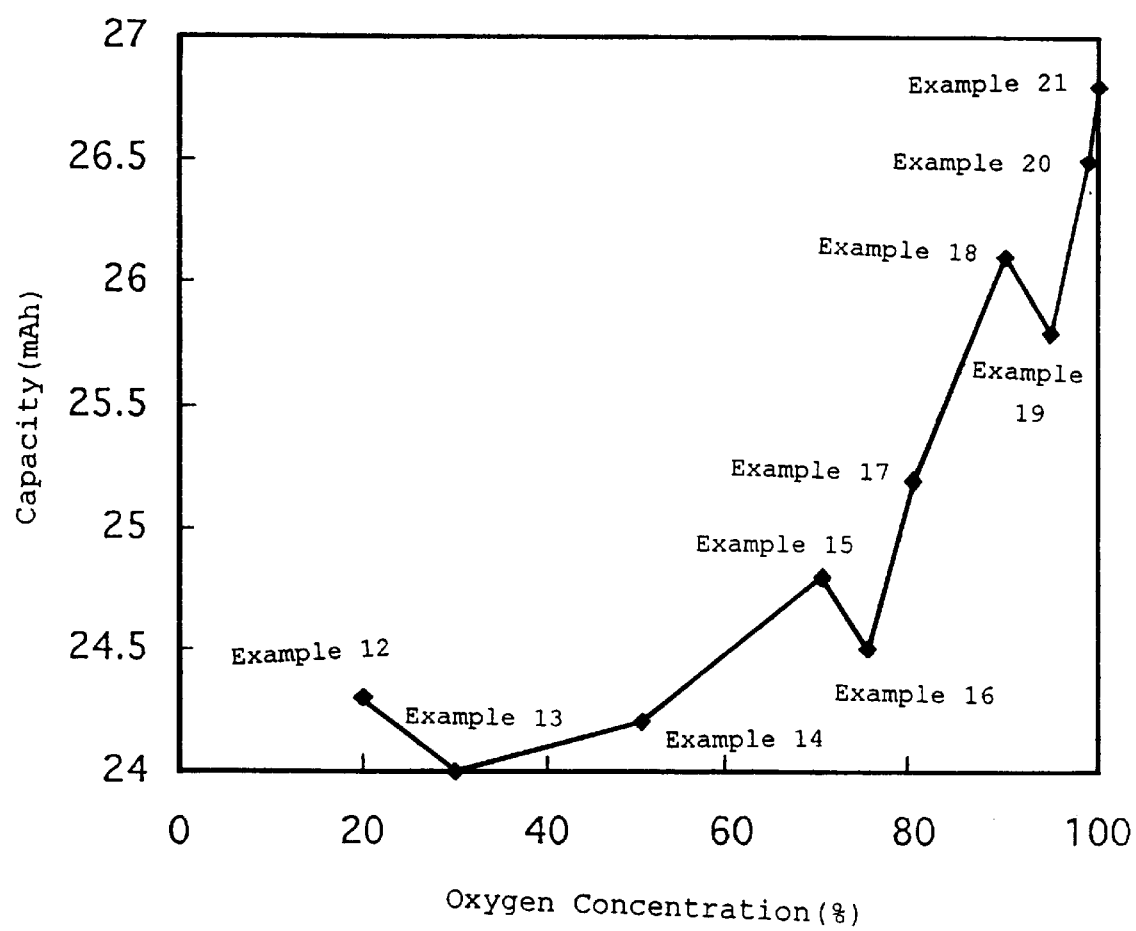
FIG. 5 shows a relationship between an oxygen concentration in a calcining atmosphere and a discharge capacity of a battery where the lithium nickel oxide is used as an active material for a positive electrode.

FIG. 5 shows a relationship between the oxygen concentration in the atmosphere and the discharge capacity. A discharge capacity of a high value was achieved when the oxygen concentration was 20% or more, preferably 70% or more or, more preferably 80% or more. Accordingly, it was noted that, when an oxygen concentration in the calcining atmosphere was 20% or more, electrodes having a high initial discharge capacity were prepared.

Examples 22–28 and Comparative Examples 4–5.

Lithium nitrate and nickel sulfate were dissolved in water to make each of their amounts 1M. In this solution, the molar ratio of lithium to nickel (Li/Ni) was 1. Solid oxalic acid was added to this aqueous solution in an amount of 4M. This corresponded to the fact that the amount of oxalic acid added was four times as much as the smaller of the molar amounts of the lithium ion and the nickel ion dissolved in the aqueous, solution. An aqueous solution where a precipitate was produced by addition of oxalic acid was filtered and the resulting precipitate was dried at 100° C.

Chemical analysis was conducted at that time for measuring the molar ratio of lithium to nickel (Li/Ni) in the precipitate and it was found to be less than 1 and, therefore, lithium oxide was added to this dried precipitate to adjust the molar ratio of lithium to nickel in the precipitate to 1.3. Then, calcining was conducted at various temperatures for investigating the relationship between the calcining temperature and the discharge capacity of the battery where the resulting lithium nickel oxide was used as an active material.

Thus, the precipitate was calcined at each of the temperatures of 450° C., 500° C., 600° C., 650° C., 700° C., 800° C., 900° C., 1000° C. and 1100° C. The calcining time was ten hours at a temperature of 450° C. to 900° C. and two hours at a temperature of 1000° C. or 1100° C. The ratio of oxygen by volume in the calcining atmosphere was 80% in all cases. The above-mentioned calcining temperatures in this order corresponded to Comparative Example 4, Examples 22–28 and Comparative Example 5, respectively.

A positive electrode was prepared using the lithium nickel oxide manufactured hereinabove as an active material. The same operations as in the preparation of the positive electrode for a coin-type battery as mentioned already were applied including the process of manufacture of the electrode and weight and size of the pellets except that lithium nickel oxide, acetylene black as a conductor and polytetrafluoroethylene as a binder were mixed in a weight ratio of 100:15:10. Preparation of a negative electrode was also conducted in the same manner as in that of the negative electrode for the above-mentioned coin-type battery.

Constitution of the coin-type battery using these electrodes was the same as that of the above-mentioned coin-type battery except that a solution where 1M of lithium phosphofluoride was dissolved in a solvent prepared by mixing ethylene carbonate and dimethyl carbonate in a ratio of 1:1 by volume was used as an electrolyte solution. Charging/discharging test of the resulting coin-type battery was also conducted in the same manner as that in the above-mentioned coin-type battery.

Figure 6:
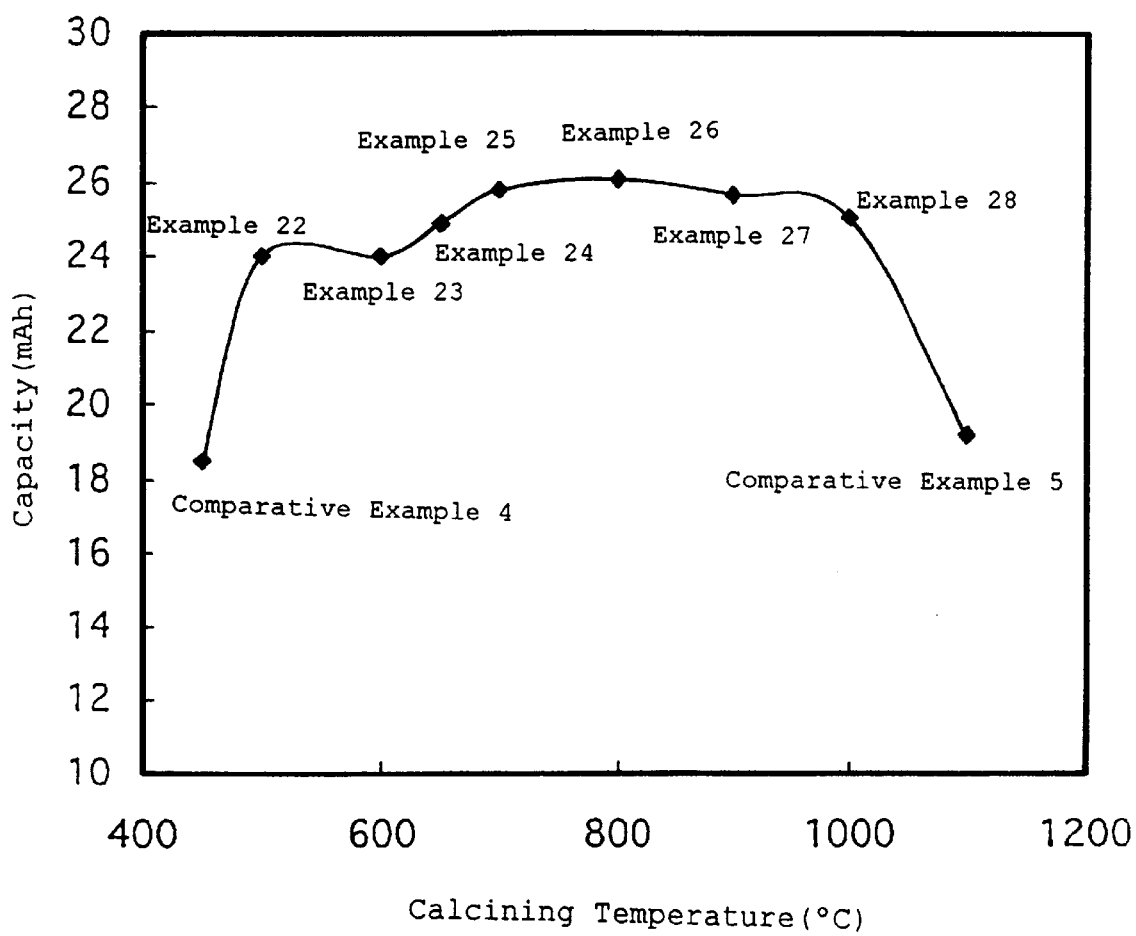
FIG. 6 shows a relationship between a calcining temperature and a discharge capacity of a battery where the lithium nickel oxide is used as an active material for a positive electrode.

FIG. 6 shows a relationship between the calcining temperature and the discharge capacity. A discharge capacity of a high value was achieved when the calcining temperature was 500° C. to 1000° C., preferably 650° C. to 900° C. Accordingly, it was noted that, when a calcining temperature was 500° C. to 1000° C., electrodes having a high initial discharge capacity were prepared.

Examples 29–38.

Lithium nitrate and nickel chloride were dissolved in water to make each of their amounts 1M, respectively. The molar ratio of lithium to nickel (Li/Ni) in this solution was 1. Oxalic acid dissolved in water was added to this solution to make the amount of the oxalic acid 4M. This corresponded to the fact that the amount of oxalic acid added was four times as much as the smaller of the molar amounts of the lithium ion and the nickel ion dissolved in the aqueous solution. The aqueous solution wherein a precipitate was formed by addition of oxalic acid was filtered and the resulting precipitate was dried at 100° C. At that time, chemical analysis was conducted to measure the molar ratio of lithium to nickel (Li/Ni) in the precipitate and it was found to be less than 1. Accordingly, lithium hydroxide was added to this dried precipitate to adjust the molar ratio of lithium to nickel (Li/Ni) in the precipitate to 1.1.

Calcining was conducted in atmospheres containing oxygen of various concentrations in order to investigate the relationship between the amount of oxygen in the calcining atmosphere and the discharge capacity of the battery where the resulting lithium nickel oxide was used as an active material. Thus, the precipitate was calcined in each of the atmospheres where the oxygen amounts by volume were 20%, 30%, 50%, 70%, 75%, 80%, 90%, 95%, 99% and 100%. In all of the cases, calcining was conducted at 800° C. for three hours. The above-mentioned oxygen amounts by volume in this order corresponded to Examples 29–38, respectively.

A positive electrode was prepared using the lithium nickel oxide manufactured hereinabove as an active material. The same operations as in the preparation of the positive electrode for a coin-type battery as mentioned already were applied including the process of manufacture of the electrode and weight and size of the pellets except that lithium nickel oxide, acetylene black as a conductor and polytetrafluoroethylene as a binder were mixed in a weight ratio of 100:5:5. Preparation of a negative electrode was also conducted in the same manner as in that of the negative electrode for the above-mentioned coin-type battery.

Constitution of the coin-type battery using these electrodes was the same as that of the above-mentioned coin-type battery except that a solution where 1M of lithium phosphofluoride was dissolved in at solvent prepared by mixing ethylene carbonate, propylene carbonate and dimethyl carbonate in a ratio of 4:1:5 by volume was used as an electrolyte solution. Charging/discharging test of the resulting coin-type battery was also conducted in the same manner as that in the above-mentioned coin-type battery.

Figure 7:
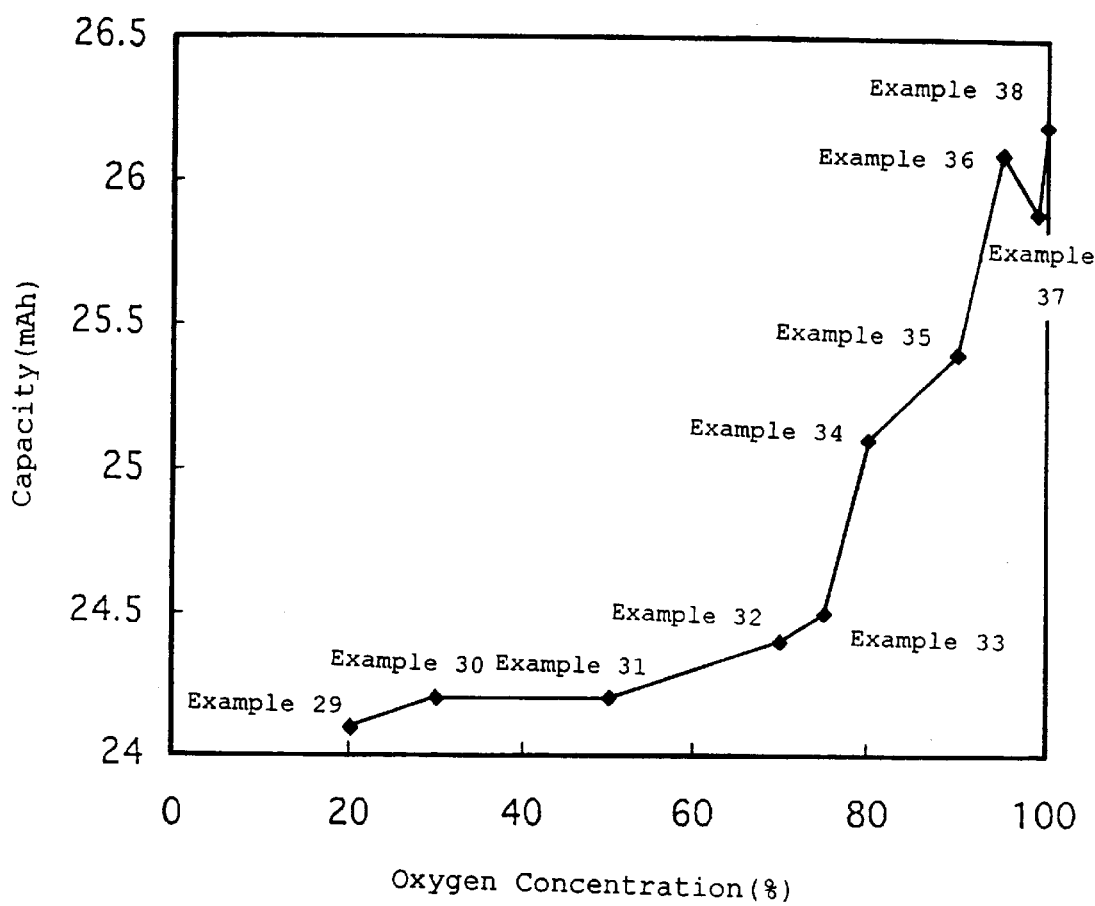
FIG. 7 shows a relationship between an oxygen concentration in a calcining atmosphere and a discharge capacity of a battery where the lithium nickel oxide is used as an active material for a positive electrode.

FIG. 7 shows a relationship between the oxygen concentration in the atmosphere and the discharge capacity. A discharge capacity as high as about 24 mAh or more was achieved when the oxygen concentration was 20% or more. Higher capacity was achieved when the concentration was preferably 70% or more or, more preferably 80% or more. Accordingly, it was noted that, when an oxygen concentration in the calcining atmosphere was 20% or more, electrodes having a high initial discharge capacity were prepared.

Examples 39–42 and Comparative Examples 6–8.

Lithium sulfate and nickel sulfate were dissolved in water to make their amounts 0.5M and 1M, respectively. In this solution, the molar ratio of lithium to nickel (Li/Ni) was 1. Solid oxalic acid was added to this aqueous solution in an amount of 3M. This corresponded to the fact that the amount of oxalic acid added was three times as much as the smaller of the molar amounts of the lithium ion and the nickel ion dissolved in the aqueous solution. An aqueous solution where a precipitate was produced by addition of oxalic acid was filtered and the resulting precipitate was dried at 100° C.

Chemical analysis was conducted at that time for measuring the molar ratio of lithium to nickel (Li/Ni) in the precipitate and it was found to be less than 1. Here, lithium nickel oxide was synthesized from precipitates having varied molar ratio of Li/Ni in order to investigate the relationship between the molar ratio of lithium and nickel (Li/Ni) in the precipitate and the discharge capacity of the battery using the resulting lithium nickel oxide as an active material. Thus, lithium oxide was added to the dried precipitate to make the molar ratio of lithium to nickel (Li/Ni) 0.8, 0.9, 1, 1.1, 1.2, 1.3 and 1.4. Each of these precipitates was calcined at 750° C. for five hours in an atmosphere containing 99% by volume of oxygen. The above-mentioned molar ratios in this order corresponded to Comparative Examples 6 and 7, Examples 39–42 and Comparative Example 8, respectively.

A positive electrode was prepared using the lithium nickel oxide manufactured hereinabove as an active material. The same operations as in the preparation of the positive electrode for a coin-type battery as mentioned already were applied including the process of manufacture of the electrode and weight and size of the pellets except that lithium nickel oxide, acetylene black as a conductor and polytetrafluoroethylene as a binder were mixed in a weight ratio of 100:5:3.

Preparation of a negative electrode was also conducted in the same manner as in that of the negative electrode for the above-mentioned coin-type battery. Constitution of the coin-type battery using these electrodes was the same as that of the above-mentioned coin-type battery except that a solution where 1M of lithium phosphofluoride was dissolved in a solvent prepared by mixing ethylene carbonate and diethylene carbonate in a ratio of 1:1 by volume was used as an electrolyte solution.

Figure 8:
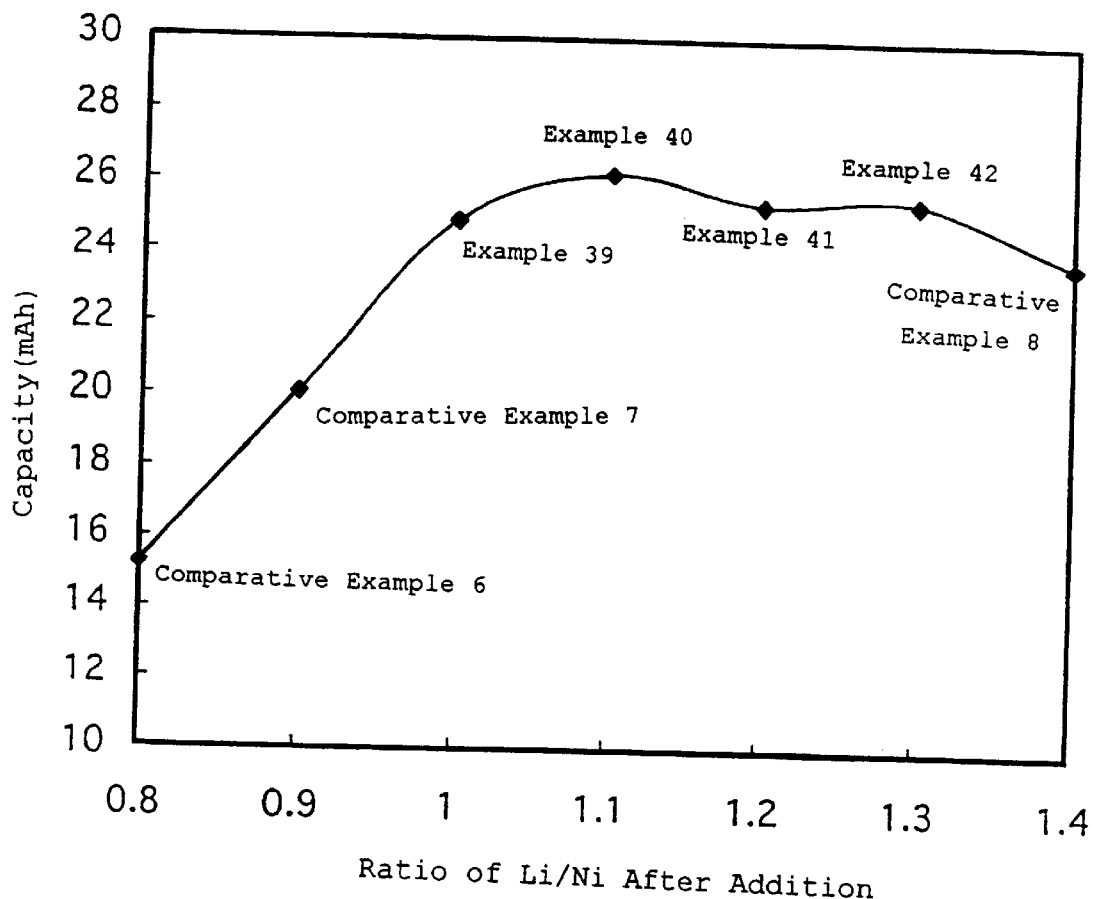
FIG. 8 shows a relationship between the molar ratio of lithium to nickel in the precipitate before calcining and the discharge capacity of a battery where lithium nickel oxide is used as an active material for a positive electrode.

Charging/discharging test of the resulting coin-type battery was also conducted in the same manner as that in the above-mentioned coin-type battery. FIG. 8 shows a relationship between the molar ratio of lithium to nickel (Li/Ni) in the precipitate and the discharge capacity. A discharge capacity of a high value was achieved when the molar ratio was in the range between 1 and 1.3. Accordingly, it was noted that a battery having a high initial discharge capacity was prepared when the molar ratio of lithium to nickel (Li/Ni) in the precipitate prior to the calcining was in the range between 1 and 1.3.

As hereinafter, the results of the charging/discharging test of a battery where lithium nickel oxide prepared in accordance with a conventional manufacturing process of lithium nickel oxide was used as an active material will be given.

Comparative Example 9.

This comparative example was a process for the manufacture of lithium nickel oxide where a mixture of a solid lithium compound and a solid nickel compound was calcined only once. Lithium hydroxide and nickel oxyhydroxide were weighed so as to make the molar ratio of lithium in lithium hydroxide to nickel in nickel oxyhydroxide 1.1:1. They were mixed in a mortar and a pressure of 100 kg/cm$^2$ was applied to the mixture to prepare pellets. The pellets were calcined at 800° C. for two hours in an oxygen atmosphere followed by pulverizing to give lithium nickel oxide for an active material.

A positive electrode was manufactured using the above-prepared lithium nickel oxide. Thus, lithium nickel oxide, acetylene black as a conductor and polytetrafluoroethylene as a binder were mixed in a weight ratio of 100:10:10 in a mortar. The mixture was molded with pressure to give pellets of 15 mm diameter, 0.75 mm thickness and 0.17 g weight.

A negative electrode was prepared as follows. Natural graphite from Madagascar (flakes; particle size: 11 mm; interplonar distance d(002) of plane (002) to the adjacent plane parallel to the plane (002): 0.337 nm; thickness (Lc) of the crystal layer in the direction of plane (002): 27 nm; extent (La) of crystal layer in the direction of plane (002): 17 nm; intensity ratio (R) of the peak observed around 1360 cm$^{-1}$ to that observed around 1580 cm$^{-1}$ of wave numbers of scattering spectrum by an argon laser Raman analysis: 0; specific surface area: 8 m$^2$/g) was used as an active material for negative electrode.

Natural graphite and polytetrafluoroethylene acting as a binder were mixed in a weight ratio of 10:1. To this mixture was added a nickel mesh as a collector and molded with pressure to prepare pellets of 15 mm diameter, 0.59 mm thickness and 0.1 g weight. The pellets were dried in vacuo at 200° C. to remove moisture therefrom.

A battery of a coin type was prepared using these electrodes and its constitution was the same as that of the coin-type battery as shown in FIG. 2. The charging/discharging test of the resulting coin-type battery was conducted as follows. A charging/discharging current was 2 mA and a constant-current charging was conducted until the upper-limit charging voltage of 4.2 V and then a constant-voltage charging was conducted at 4.2 V. Total time for the constant-current charging and the constant-voltage charging was 24 hours. Constant-current discharging was conducted until 2.5 V of the lower-limit discharging voltage. In the second run and thereafter, charging/discharging was conducted within a range of the same current and voltage and the discharge capacity at the third charging/discharging cycle was measured. At that time, the discharge capacity was found to be 22.5 mAh.

Comparative Example 10.

This comparative example was a process for the manufacture of lithium nickel oxide where a mixture of a solid lithium compound and a solid nickel compound was calcined twice. Lithium hydroxide and nickel oxide were weighed so as to make the molar ratio of lithium in lithium hydroxide to nickel in nickel oxide 1.1:1. They were mixed in a mortar and a pressure of 100 kg/cm$^2$ was applied to the mixture to give pellets. The pellets were calcined at 600° C. for 24 hours in an air atmosphere, then calcined at 800° C. in an atmosphere of oxygen for two hours and pulverized to give lithium nickel oxide as an active material.

A positive electrode was manufactured using the above-prepared lithium nickel oxide as an active material. Processes for the manufacture of positive and negative electrodes and constitution of the battery were in accordance with these of the above-mentioned coin-type battery by prior art using lithium nickel oxide. Charging/discharging test was conducted in the same manner as that in the above-mentioned coin-type battery by prior art. As a result, the discharge capacity was found to be 23.1 mAh.

Comparative Example 11.

This comparative example was a process for the manufacture of lithium nickel oxide where an aqueous solution of a lithium compound and an aqueous solution of a nickel compound were mixed. Lithium hydroxide and nickel chloride were weighed so as to make the molar ratio of lithium in lithium hydroxide to nickel in nickel chloride 1:1. Each of them was dissolved in water to prepare the aqueous solutions.

The aqueous solution of lithium hydroxide was gradually added to the aqueous solution of nickel chloride with stirring and the mixture was stirred at 30° C. for five hours. This was dried at 90° C. to 100° C. and the resulting solid was pulverized. Pressure of 100 kg/cm$^2$ was applied thereto to give pellets. The pellets were calcined at 800° C. for two hours in an atmosphere of oxygen to give lithium nickel oxide, for an active material.

A positive electrode was manufactured using the above-prepared lithium nickel oxide as an active material. Processes for the manufacture of positive and negative electrodes and constitution of the battery were in accordance with these of the above-mentioned coin-type battery by prior art using lithium nickel oxide. Charging/discharging test was conducted in the same manner as that in the above-mentioned coin-type battery by prior art. As a result, the discharge capacity was found to be 22.3 mAh.

Comparative Example 12.

This comparative example was a process for the manufacture of lithium nickel oxide where water was added as a dispersing medium to a solid lithium compound and a solid nickel compound. Lithium hydroxide and nickel hydroxide were weighed so as to make the molar ratio of lithium in lithium hydroxide to nickel in nickel hydroxide 1:1.

A small amount of water was added to the above lithium hydroxide and nickel hydroxide followed by mixing in a mortar. This was dried at 90° C. to 100° C. and the resulting solid was pulverized. Pressure of 100 kg/cm$^2$ was applied thereto to give pellets and the resulting pellets were calcined at 800° C. for two hours in an atmosphere of oxygen to give lithium nickel oxide as an active material.

A positive electrode was manufactured using the above-prepared lithium nickel oxide as an active material. Processes fcr the manufacture of positive and negative electrodes and constitution of the battery were in accordance with these of the above-mentioned coin-type battery by prior art using lithium nickel oxide. Charging/discharging test was conducted in the same manner as that in the above-mentioned coin-type battery by prior art. As a result, the discharge capacity was found to be 23.7 mAh.

Comparative Example 13.

This comparative example was a process for the manufacture of lithium nickel oxide where a solid nickel compound was mixed with an aqueous solution of a lithium compound. Thus, lithium chloride and nickel oxide were weighed so as to make the molar ratio of lithium in lithium chloride to nickel in nickel oxide 1:1. Lithium chloride was dissolved in water to prepare the aqueous solution.

The aqueous solution of lithium chloride was gradually added to nickel oxide with kneading followed by stirring/kneading at 30° C. for five hours. This was dried at 90° C. to 100° C. and the resulting solid was pulverized and a pressure of 100 kg/cm$^2$ was applied thereto to give pellets. The pellets were calcined at 800° C. for two hours in an atmosphere of oxygen to give lithium nickel oxide as an active material.

A positive electrode was manufactured using the above-prepared lithium nickel oxide as an active material. Processes for the manufacture of positive and negative electrodes and constitution of the battery were in accordance with these of the above-mentioned coin-type battery by prior art using lithium nickel oxide. Charging/discharging test was conducted in the same manner as that in the above-mentioned coin-type battery by prior art. As a result, the discharge capacity was found to be 23.3 mAh.

As shown in FIGS. 3–8, the discharge capacity was about 24 mAh or higher in the case of coin-type batteries where lithium nickel oxide in accordance with the present invention was used as a positive electrode active material. The coin-type batteries using lithium nickel oxide in the above Comparative Examples as a positive electrode active material were subjected to the same charging/discharging test but a comparison of the results shows that the products of the present invention gave high values. Accordingly, the conclusion will be that the battery where lithium nickel oxide in accordance with the present invention is used as a positive electrode active material is superior to that where lithium nickel oxide by the prior art is used for a positive electrode.

Example 43.

In this example, a charging/discharging test of tlhe cylindrical battery in accordance with the present invention was conducted. First, a positive electrode in a form of a sheet was prepared. Thus, lithium chloride and nickel sulfate were dissolved in water in amounts of 1M and 0.1M, respectively. To this aqueous solution was added an aqueous solution of oxalic acid in an amount of 0.3M. A precipitate formed by addition of oxalic acid was filtered and was dried at 100° C. The dried precipitate was calcined at 800° C. for three hours in an atmosphere of oxygen and the resulting calcined product was pulverized.

A process of manufacturing an electrode using the above lithium nickel oxide as an active material was as follows. Lithium nickel oxide, acetylene black as a conductor and polyvinylidene fluoride as a binder were mixed in a weight ratio of 100:7:10. This was further mixed with N-methyl-2-pyrrolidone as a dispersing agent to prepare a paste for a positive electrode.

The paste for positive electrode was applied onto both sides of aluminum foil (thickness: 20 mm) acting as a collector, dried and rolled followed by cutting into strips. Weight of the active material per unit area of the positive electrode was 40 mg/cm$^2$. An aluminum tab acting as a positive electrode lead was attached to one end of the positive electrode by means of spot welding.

Artificial graphite (particle size: 8 mm; interplonar distance d(002) of plane (002) to the adjacent plane parallel to the plane (002): 0.337 nm; thickness (Lc) of the crystal layer in the direction of plane (002): 25 nm; extent (La) of crystal layer in the direction of plane (002): 13 nm; intensity ratio (R) of the peak observed around 1360 cm$^{-1}$ to that observed around 1580 cm$^{-1}$ of wave numbers of scattering spectrum by an argon laser Raman analysis: 0; specific surface area: 12 m$^2$/g) was used as a negative electrode active material. The artificial graphite and polyvinylidene fluoride acting as a binder were mixed in a weight ratio of 100:10.

To this mixture was added N-methyl-2-pyrrolidone as a dispersing agent followed by mixing to prepare a paste for a negative electrode. The paste for a negative electrode was applied onto both sides of a copper foil (thickness: 18 mm) acting as a collector, dried and cut into strips. Weight of the active material of the negative electrode per unit area was 20 mg/cm$^2$. A nickel tab acting as a negative electrode lead was attached to one of the negative electrode by means of spot welding.

Figure 9:
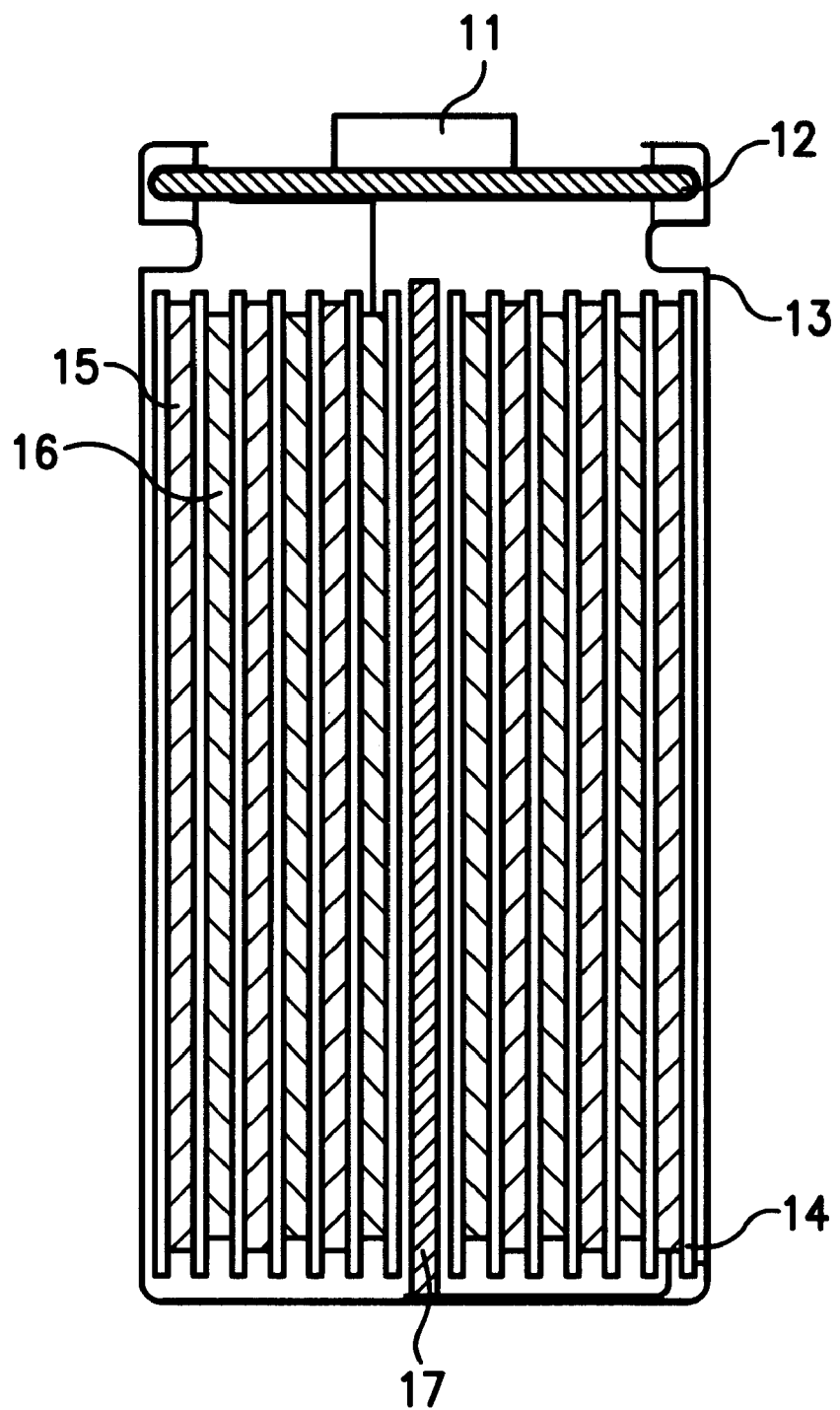
FIG. 9 shows a cross sectional view of a cylindrical battery in accordance with the present invention.

Constitution of a cylindrical battery using these electrodes was as follows. FIG. 9 shows a cross sectional view of the cylindrical battery of the present invention. A microporous separator 14 which was made of polyethylene was sandwiched between each pair of positive electrode 16 and negative electrode 15. These were integrally wound in at spiral form from an end to prepare a cylindrical winding element.

The cylindrical winding element was placed in a cylindrical battery can (diameter: 17 mm; height: 50 mm; made of stainless steel) in such a state that a positive electrode lead was pulled out from the upper side while a negative electrode lead was pulled out from the lower side. The positive and negative electrode leads were attached to the positive electrode cover equipped with a safety valve and to the bottom of the battery can, respectively by means of spot welding. In order to retain the wound shape, a center pin 17 (diameter: 3.4 mm; length: 40 mm; in a shape of a tube made of stainless steel) was inserted in the center of the winding element.

An electrolyte solution prepared by dissolving lithium phosphofluoride in an amount of 1M in a mixed solvent of ethylene carbonate and diethyl carbonate in a ratio of 1:1 by volume was placed in a battery can. An insulation packing 12 was placed between a positive electrode cover 11 and a battery can 13 and they were tightly sealed by means of caulking.

A charging/discharging test of this cylindrical battery was conducted as follows. In a thermostat vessel of 25° C., charging was conducted by means of a constant current and constant voltage for three hours at the constant current of 500 mA and the voltage with an upper limit of 4.2 V and then a constant-current discharging was conducted at 100 mA where the lower limit of voltage was 2.75 V. The second run and hereafter were conducted in the same manner. The result was that the discharge capacity at the first cycle of charging/discharging was 918 mAh and the discharge capacity at the 50th cycle was 830 mAh. Accordingly, the nonaqueous secondary battery of the present invention was confirmed to be a secondary battery wherein the discharge capacity does not decrease even when a charging/discharging cycle was repeatedly conducted.

As mentioned hereinabove, in the process for the manufacture of lithium nickel oxide in accordance with the present invention, a mixture of a lithium compound and a nickel compound is prepared by a coprecipitation reaction and, therefore, the resulting mixture is in such a state that lithium and nickel were well homogeneously mixed. Accordingly, its calcining is easy whereby it is possible to calcine at lower temperature.

In a nonaqueous secondary battery of the present invention where lithium nickel oxide obtained by calcining the above mixture is used as a positive electrode active material, it is now possible to achieve an initial discharge capacity of a high value. In addition, the discharge capacity decreases significantly less in a secondary battery of the present invention than in the conventional secondary battery upon repeated charging/discharging operations, whereby a secondary battery having a long life is achieved.

What is claimed is:

1. A process of preparing lithium nickel oxide as a positive electrode active material comprising:
    a) dissolving a water-soluble lithium compound and a water-soluble nickel compound in water to form a homogeneous aqueous solution in which the lithium compound and nickel compound are thoroughy mixed;
    b) co-precipitating by addition of an organic acid a lithium salt and a nickel salt in the aqueous solution;
    c) isolating the resulting co-precipitate by filtering the co-precipitate from the aqueous solution, and
    d) calcining the co-precipitate to obtain lithium, oxide.

2. A process according to claim 1, wherein a molar ratio of lithium to nickel (Li/Ni) in the water-soluble nickel compound and the water-soluble lithium compound in water is 1 or more.

3. A process according to claim 1, wherein the organic acid is an aliphatic monocarboxylic or dicarboxylic acid having or not having hydroxyl group or an aliphatic tricarboxylic acid having hydroxyl group.

4. A process according to claim 3, wherein the aliphatic dicarboxylic acid is oxalic acid, malonic acid, succinic acid, maleic acid, fumaric acid, malic acid, citramalic acid, or tartaric acid.

5. A process according to claim 4, wherein the aliphatic dicarboxylic acid is oxalic acid.

6. A process according to claim 5, wherein the oxalic acid is added to the aqueous solution in a molar amount of 3 to 6 times as much as the smaller one of the molar amounts of a lithium ion and a nickel ion dissolved in the aqueous solution.

7. A process according to claim 1, wherein the water-soluble lithium compound is lithium sulfate, lithium nitrate, lithium chloride, lithium bromide, lithium iodide or lithium acetate.

8. A process according to claim 1, wherein the water-soluble nickel compound is nickel sulfate, nickel nitrate, nickel chloride, nickel bromide, nickel iodide or nickel acetate.

9. A process according to claim 1, wherein a lithium compound is mixed with the co-precipitate before the calcination.

10. A process according to claim 9, wherein the lithium compound mixed with the co-precipitate before the calcination is lithium nitrate, lithium acetate, lithium iodide, lithium hydroxide, lithium oxide, lithium carbonate, lithium oxalate, lithium chloride, lithium bromide or lithium peroxide.

11. A process according to claim 9, wherein the lithium compound mixed with the co-precipitate is used in such an amount as to adjust a molar ratio of lithium to nickel (Li/Ni) in the co-precipitate to 1–1.3.

12. A process according to claim 1, wherein the calcination is conducted at a temperature of 500° C. to 1000° C.

13. A process according to claim 1, wherein the calcination is conducted in an atmosphere containing 20% or more by volume of oxygen.

14. A process according to claim 1, wherein the lithium nickel oxide has a composition formula $Li_xNiO_2$ ($0.8 \leq X \leq 1.2$).

15. A nonaqueous secondary battery comprising the lithium nickel oxide obtained according to claim 1 as an active material for a positive electrode.

16. A nonaqueous secondary battery according to claim 15 having a discharge capacity of not less than 24 mAh.

* * * * *